United States Patent
Chen et al.

(10) Patent No.: US 12,197,464 B2
(45) Date of Patent: *Jan. 14, 2025

(54) ASYNCHRONOUS AND SYNCHRONOUS TRANSMIT PRIORITY MECHANISM

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 740 days.

This patent is subject to a terminal disclaimer.

(21) Appl. No.: 16/400,246

(22) Filed: May 1, 2019

(65) Prior Publication Data

US 2020/0348845 A1 Nov. 5, 2020

(51) Int. Cl.
*G06F 16/27* (2019.01)
*G06F 3/06* (2006.01)

(52) U.S. Cl.
CPC ............ *G06F 16/27* (2019.01); *G06F 3/0613* (2013.01); *G06F 3/065* (2013.01); *G06F 3/067* (2013.01); *G06F 3/0683* (2013.01); *G06F 16/273* (2019.01); *G06F 16/275* (2019.01)

(58) Field of Classification Search
None
See application file for complete search history.

(56) References Cited

U.S. PATENT DOCUMENTS

| | | | | |
|---|---|---|---|---|
| 6,496,908 | B1* | 12/2002 | Kamvysselis | G06F 11/2058 709/200 |
| 8,335,899 | B1* | 12/2012 | Meiri | G06F 11/2069 711/E12.001 |
| 8,527,626 | B1* | 9/2013 | Wang | G06F 3/067 709/224 |
| 9,632,850 | B1* | 4/2017 | Emam | G06F 9/542 |
| 9,684,561 | B1* | 6/2017 | Yan | G06F 11/1402 |
| 2006/0149898 | A1* | 7/2006 | Bello | G06F 3/0611 711/2 |
| 2010/0299447 | A1* | 11/2010 | Salvi | G06F 11/2066 709/233 |
| 2011/0131385 | A1* | 6/2011 | Henriksson | G06F 13/1642 711/158 |
| 2017/0286159 | A1* | 10/2017 | Thiruvengadachari | G06F 9/4881 |
| 2020/0278941 | A1* | 9/2020 | Bavishi | G06F 13/161 |

* cited by examiner

*Primary Examiner* — Neveen Abel Jalil
*Assistant Examiner* — John J Morris
(74) *Attorney, Agent, or Firm* — Krishnendu Gupta; Lesley Leonessa

(57) ABSTRACT

A method is used in managing an asynchronous and synchronous transmit priority mechanism. The method receives a plurality of replication requests in conjunction with a replication process, where the plurality of replication requests comprises at least one of a first replication request or a second replication request. A first storage system that comprises a plurality of storage devices is configured to participate in the replication process with a second storage system that comprises a plurality of storage devices. The method determines an execution order to optimize processing of the plurality of replication requests, where a first replication request execution order that optimizes processing of the at least one first replication request conflicts with optimizing processing of the at least one second replication request.

17 Claims, 11 Drawing Sheets

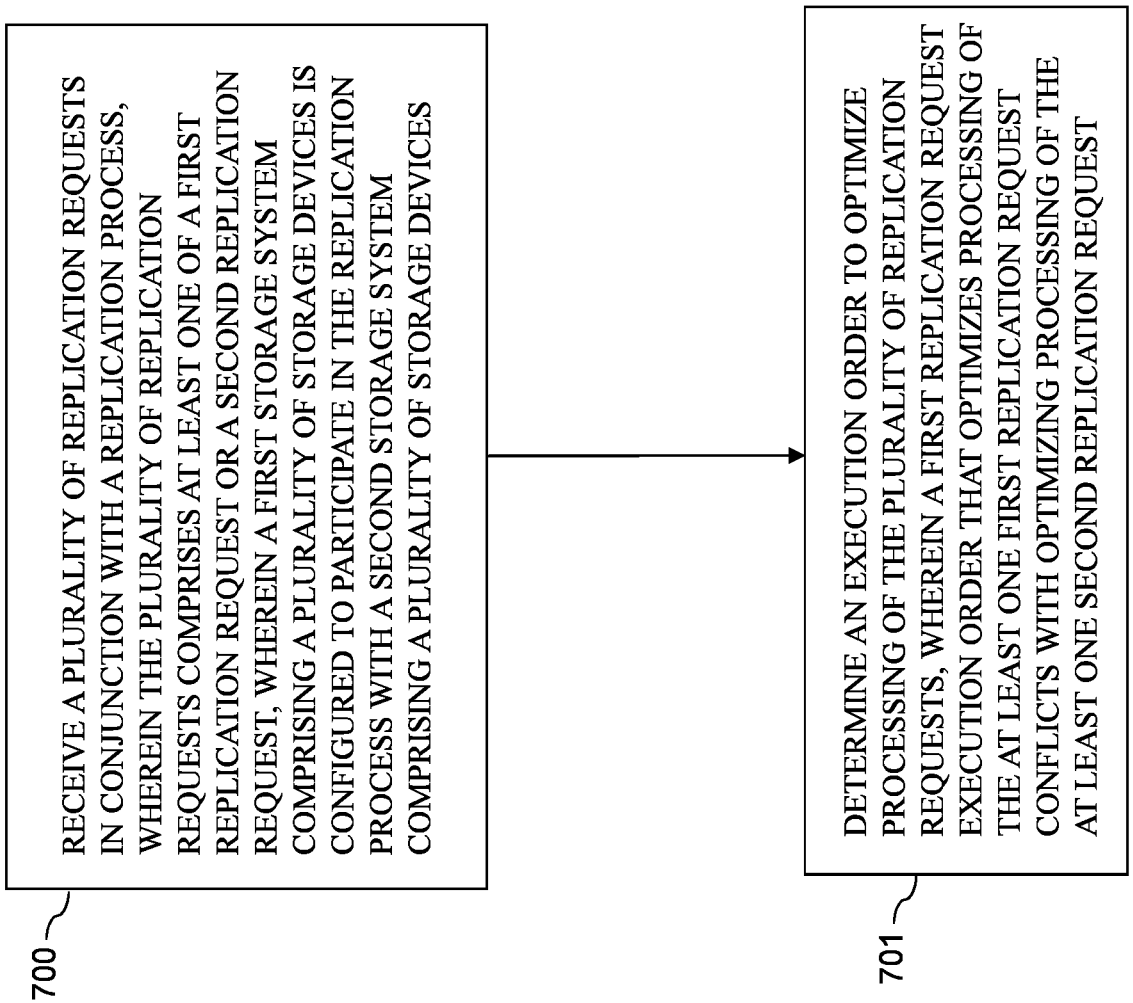

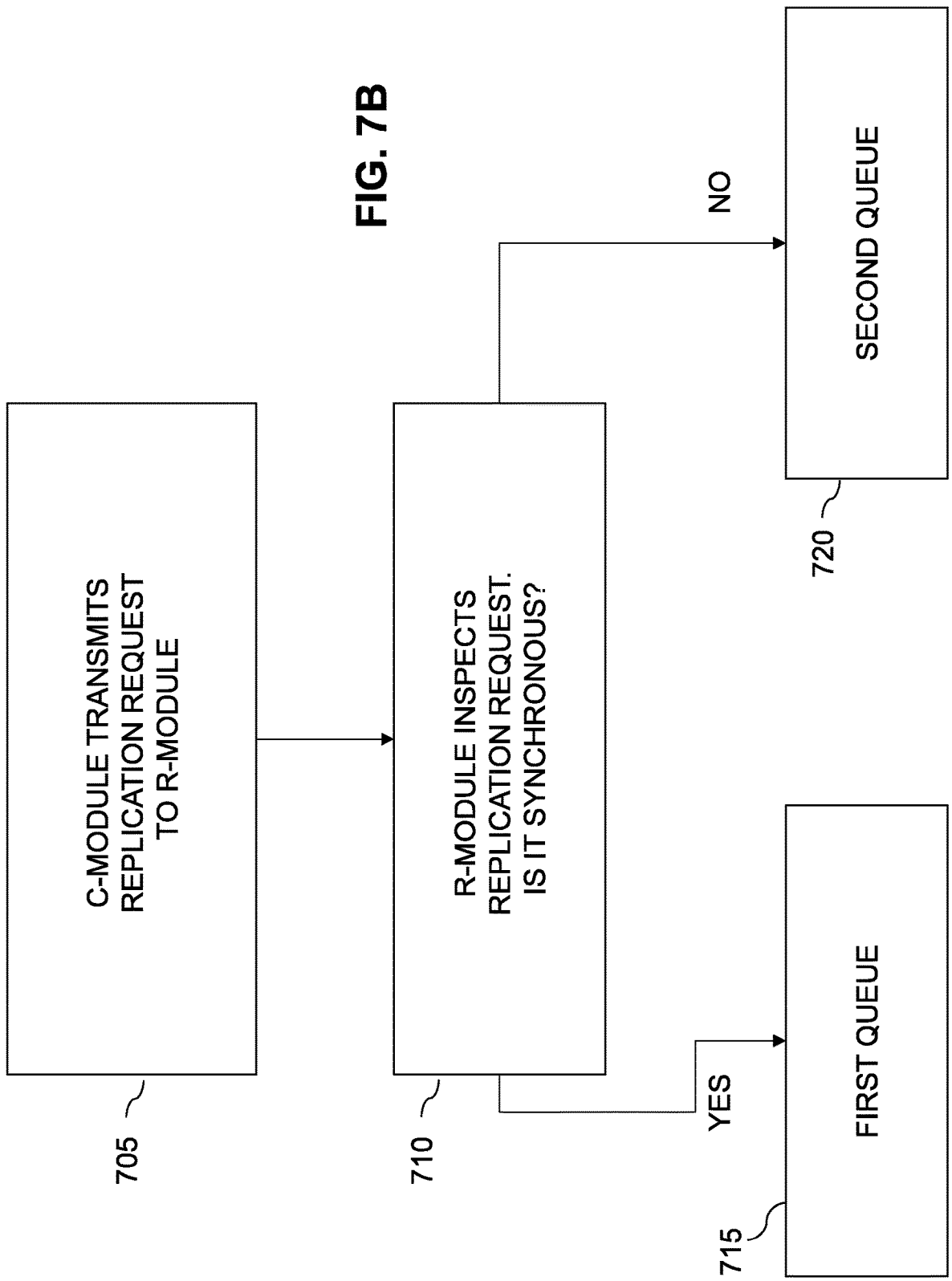

ASYNCHRONOUS AND SYNCHRONOUS TRANSMIT PRIORITY MECHANISM

CROSS REFERENCE TO RELATED APPLICATIONS

This Application is related to co-pending U.S. patent application Ser. No. 16/400,329 entitled "ASYNCHRONOUS AND SYNCHRONOUS TRANSMIT PRIORITY MECHANISM" both filed concurrently herewith, the teachings of which applications are hereby incorporated herein by reference in their entirety.

BACKGROUND

Technical Field

This application relates to an asynchronous and synchronous transmit priority mechanism.

Description of Related Art

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

BRIEF DESCRIPTION OF THE DRAWINGS

FIGS. 7A-7C are flow diagrams of a process for managing an asynchronous and synchronous transmit priority mechanism in an illustrative embodiment.

DETAILED DESCRIPTION

Figure 1:
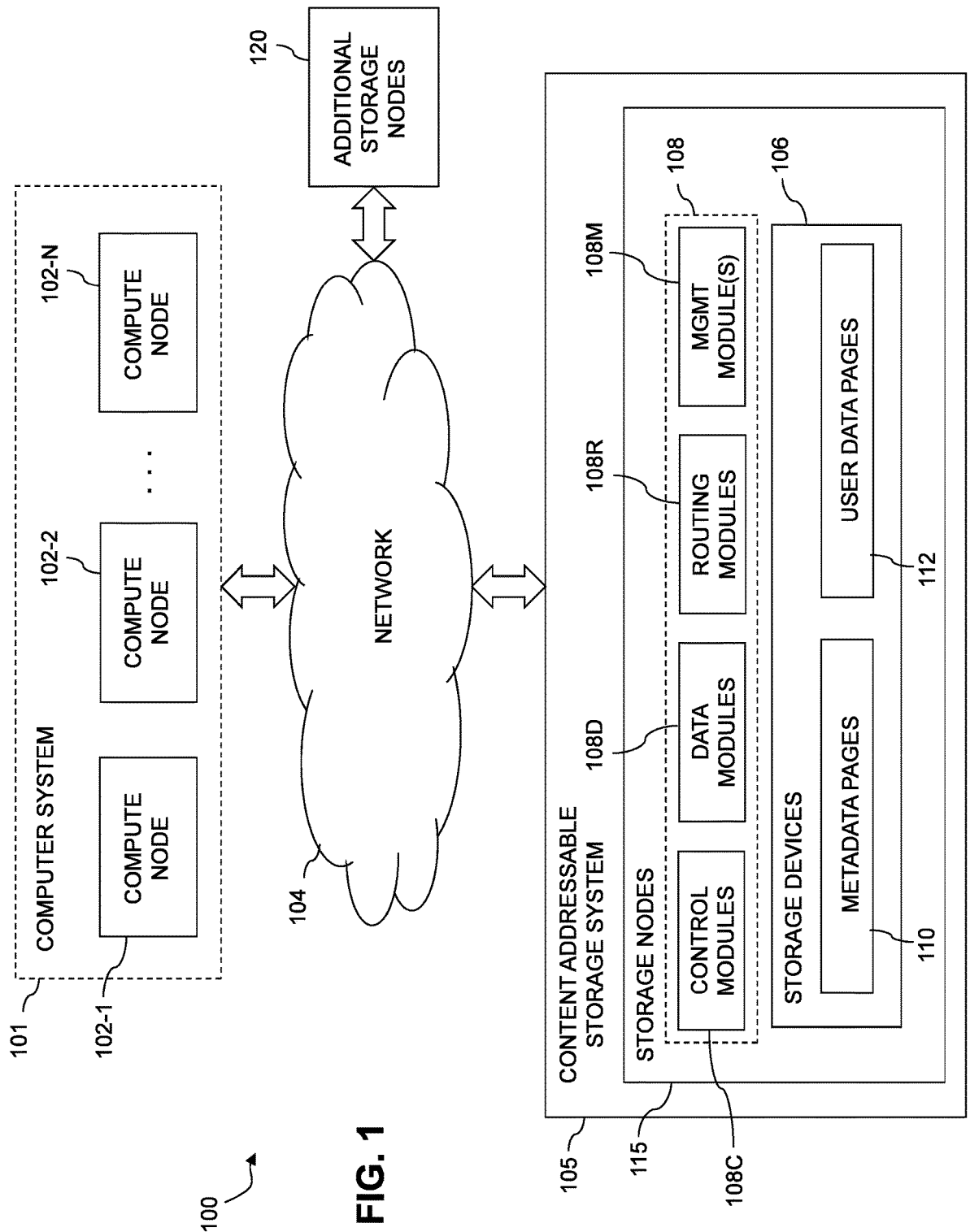
FIG. 1 is a block diagram of an information processing system comprising a content addressable storage system configured with functionality for managing an asynchronous and synchronous transmit priority mechanism in an illustrative embodiment.

Described below is a technique for use in managing an asynchronous and synchronous transmit priority mechanism, which technique may be used to provide, among other things, receiving a plurality of replication requests in conjunction with a replication process, where the plurality of replication requests comprises at least one of a first replication request or a second replication request, and where a first storage system comprising a plurality of storage devices is configured to participate in the replication process with a second storage system comprising a plurality of storage devices, and determining an execution order to optimize processing of the plurality of replication requests, where a first replication request execution order that optimizes processing of at least one first replication request conflicts with optimizing processing of at least one second replication request.

As described herein, in at least one embodiment of the current technique, the method receives a plurality of replication requests in conjunction with a replication process, where the plurality of replication requests comprises at least one of a first replication request or a second replication request, and where a first storage system comprising a plurality of storage devices is configured to participate in the replication process with a second storage system comprising a plurality of storage devices. The method determines an execution order to optimize processing of the plurality of replication requests, where an execution order that optimizes processing of the synchronous replication requests may not provide the asynchronous replication requests the necessary bandwidth needed to process the asynchronous replication requests, and an execution order that optimizes processing of the asynchronous replication requests may result in an unacceptable latency for the synchronous replication requests.

Typically, a replication process between two storage devices may execute with two types of replication modes. A synchronous replication mode, in some embodiments, is configured to mirror data writes between a first storage system, and a second storage system. For example, when a host device writes data to the first storage system, the first storage system responds to the host device with an acknowledgement of successful storage in the first storage system only after the first storage system sends the data to (i.e., replicates the data to) the second storage system and receives an acknowledgement of successful storage back from the second storage system. Therefore, the synchronous replication mode is sensitive to the latency of the replication process.

The asynchronous replication mode, in some embodiments, implements cycle-based asynchronous replication to periodically transfer data in multiple cycles from the first storage system to the second storage system. The data replicated from the first storage system to the second storage system may include all of the data stored in the first storage system, or only certain designated subsets of the data stored in the first storage system. Different replication processes of different types may be implemented for different parts of the stored data. The asynchronous replication mode is sensitive to bandwidth, for example, how many megabytes (MB) per second can be transferred from the first storage system to the second storage system. In the asynchronous replication mode, the host receives acknowledgment and is not waiting for the data transfer, and therefore, latency is not as important to the asynchronous replication mode as is the available bandwidth.

Conventional approaches to data replication between two storage devices can be problematic under certain conditions. For example, a replication engine or other arrangement of replication control logic that manages replication requests of both synchronous and asynchronous modes may result in competing interests, where providing the synchronous replication requests with the processing time necessary to achieve latency requirements may starve the asynchronous replication requests of the bandwidth requirements necessary to process the asynchronous replication requests efficiently. Conventional technologies do not provide a solution where the replication engine or other replication control logic responsible for replication data transmission can process both synchronous replication requests and asynchronous replication requests, where the synchronous replication requests are processed as fast as possible while the asynchronous replication requests are given as much bandwidth as possible.

By contrast, in at least some implementations in accordance with the current technique as described herein, a method receives a plurality of replication requests in conjunction with a replication process, where the plurality of replication requests comprises at least one of a first replication request or a second replication request, and where a first storage system comprising a plurality of storage devices is configured to participate in the replication process with a second storage system comprising a plurality of storage devices. The method determines an execution order to optimize processing of the plurality of replication requests, where a first replication request execution order that optimizes processing of at least one first replication request conflicts with optimizing processing of at least one second replication request.

Thus, in at least one embodiment of the current technique, by optimizing the processing of both synchronous replication requests and asynchronous replication requests, the method balances the latency requirements of the synchronous replication requests along with the bandwidth requirements of the asynchronous replication requests. The current method also provides a machine learning system that tunes the processing of the synchronous replication requests and the asynchronous replication requests to achieve this optimization.

Thus, a goal of the current technique is to provide a method and a system for managing an asynchronous and synchronous transmit priority mechanism. Another goal is to optimize the replication process. Yet another goal is to provide a tunable machine learning system that can balance latency requirements of synchronous replication requests with bandwidth requirements of asynchronous replication requests.

In at least some implementations in accordance with the current technique described herein, the use of an asynchronous and synchronous transmit priority mechanism can provide one or more of the following advantages: enhancing replication processing performance, balancing the competing requirements of synchronous replication requests and asynchronous replication requests, and responding to changes in user requirements for latency and/or bandwidth, etc.

In contrast to conventional technologies, in at least some implementations in accordance with the current technique as described herein, a method receives a plurality of replication requests in conjunction with a replication process, where the plurality of replication requests comprises at least one of a first replication request or a second replication request, and where a first storage system comprising a plurality of storage devices is configured to participate in the replication process with a second storage system comprising a plurality of storage devices. The method determines an execution order to optimize processing of the plurality of replication requests, where a first replication request execution order that optimizes processing of at least one first replication request conflicts with optimizing processing of at least one second replication request.

In an example embodiment of the current technique, the first replication request comprises a synchronous replication request and the second replication request comprises an asynchronous replication request.

In an example embodiment of the current technique, the method receives the plurality of replication requests at a first module, from a second module, where at least one second replication request is optimized at the second module.

In an example embodiment of the current technique, the method assigns at least one first replication request to a first queue and assigns at least one second replication request to a second queue.

In an example embodiment of the current technique, the method polls the first queue and the second queue according to a polling frequency value.

In an example embodiment of the current technique, the method polls the first queue for at least one first replication request, where the first queue is repeatedly polled a number of times fewer than the polling frequency value. After repeatedly polling the first queue the number of times, the method polls the second queue for at least one second replication request.

In an example embodiment of the current technique, the number of times fewer than the polling frequency value is one less than the polling frequency value.

In an example embodiment of the current technique, after polling the second queue once, the method repeatedly polls the first queue the number of times fewer than the polling frequency value.

In an example embodiment of the current technique, the method polls the first queue for at least one first replication request and determines that the first queue is empty. In response, the method polls the second queue for at least one second replication request.

In an example embodiment of the current technique, the method tunes the polling frequency value to optimize the processing of the plurality of replication requests.

In an example embodiment of the current technique, the method determines a latency associated with processing at least one first replication request and tunes the polling frequency value according to a range that meets a latency requirement.

In an example embodiment of the current technique, the method determines a bandwidth requirement associated with processing at least one second replication request and tunes the polling frequency value according to a bandwidth range that meets the bandwidth requirement.

In an example embodiment of the current technique, the method tunes the polling frequency value to balance a latency requirement associated with the first replication request with providing a bandwidth range associated with the second replication request.

In an example embodiment of the current technique, the method uses a machine learning system to tune the polling frequency value.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Massachusetts. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Such content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
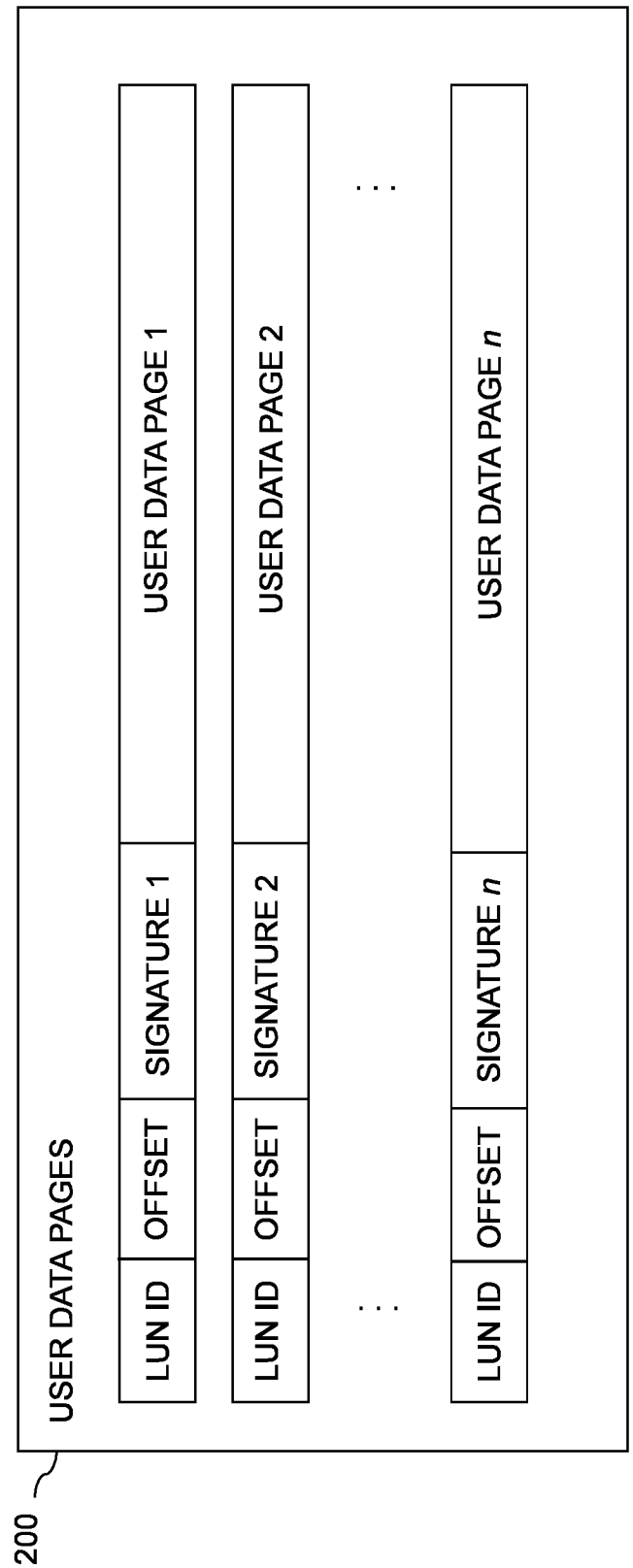
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User DataPage n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
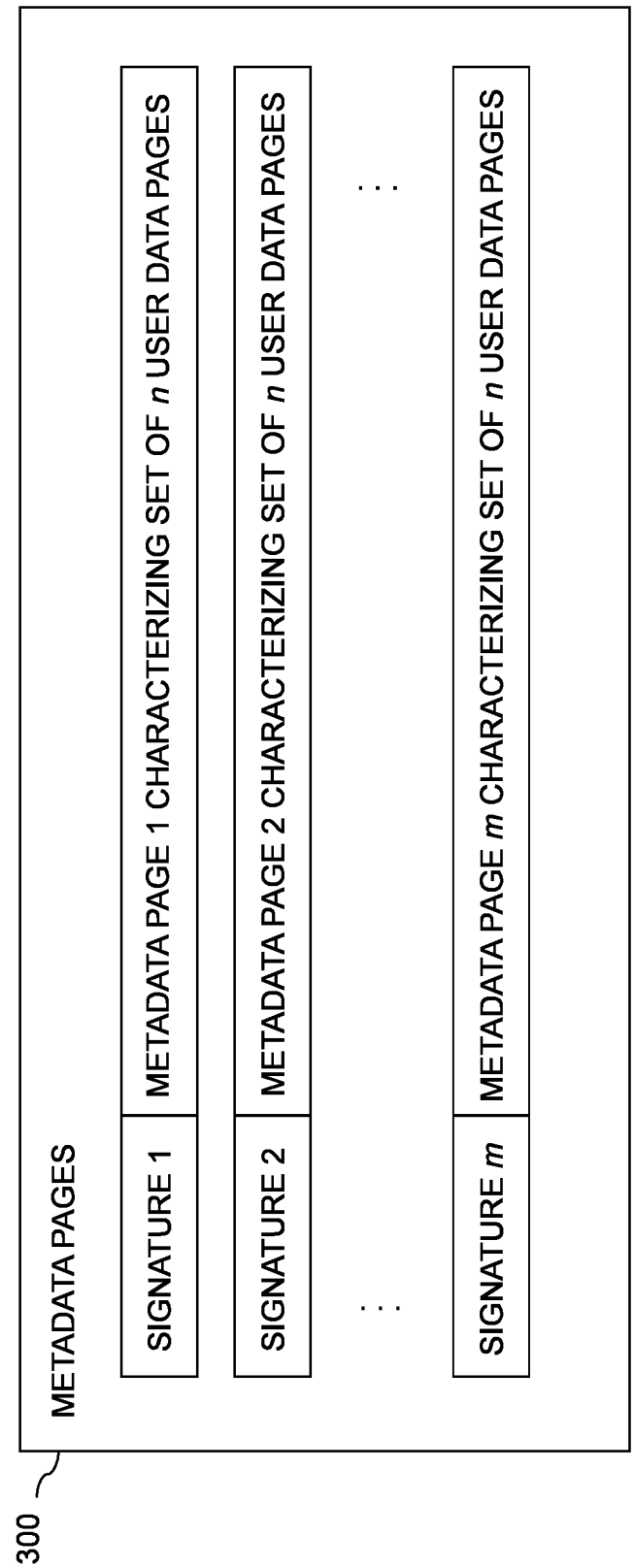
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for an asynchronous and synchronous transmit priority mechanism used in a replication process carried out between the content addressable storage system 105 and another storage system. The term "replication process" as used herein is intended to be broadly construed, so as to encompass a single replication process that includes separate asynchronous and synchronous replication modes, as well as a replication process that includes multiple separate asynchronous and synchronous replication processes. In an arrangement of the latter type, the asynchronous and synchronous replication processes are also considered examples of what are more generally referred to herein as respective asynchronous and synchronous "replication modes."

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links are established between the various processing modules of the distributed storage controller 108 using well-known communication protocols such as Transmission Control Protocol (TCP) and Internet Protocol (IP). For example, respective sets of IP links used in replication data transfer could be associated with respective different ones of the routing modules 108R and each such set of IP links could include a different bandwidth configuration.

Ownership of a user data logical address space within the content addressable storage system 105 is illustratively distributed among the control modules 108C. The management module 108M is assumed to include a replication engine or other arrangement of replication control logic that engages corresponding replication control logic instances in all of the control modules 108C and routing modules 108R in order to implement a data replication process within the system 100, as will be described in more detail below in conjunction with FIG. 4. The data replication process illustratively involves replicating data from one portion of a storage system to another portion of that system, or from one storage system to another storage system. It is desirable in these and other data replication contexts to implement an asynchronous and synchronous transmit priority mechanism functionality in order to optimize the replication process.

In some embodiments, the content addressable storage system 105 comprises an XtremIO™ storage array suitably modified to incorporate asynchronous and synchronous transmit priority mechanism techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments.

Accordingly, an asynchronous and synchronous transmit priority mechanism used in a replication process in some embodiments is implemented under the control of at least one system-wide management module of the distributed storage controller 108.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

As mentioned previously, storage controller components in an XtremIO™ storage array illustratively include C-module and D-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

The content addressable storage system 105 in the FIG. 1 embodiment is assumed to be configured to participate in a replication process with a second storage system that is not explicitly shown in the figure. The content addressable storage system 105 is an example of what is referred to herein as a "first storage system" relative to the second storage system. In certain description below, the content addressable storage system 105 will therefore be referred to as the first storage system. Each of the first and second storage systems comprises a plurality of storage devices, such as flash-based storage devices. In an example embodiment, the storage controller of the first storage system comprises replication control logic configured to cooperatively interact with corresponding replication control logic in a storage controller of the second storage system in order to execute a replication process carried out between the first and second storage systems. The second storage system can be implemented on the same processing platform as the first storage system or on a different processing platform. The replication control logic of a given one of the first and second storage systems may comprise software, hardware or firmware, or combinations thereof, implemented in one or more storage node processing modules, such as control modules, data modules, routing modules and management modules of a distributed storage controller of the corresponding storage system.

Figure 4:
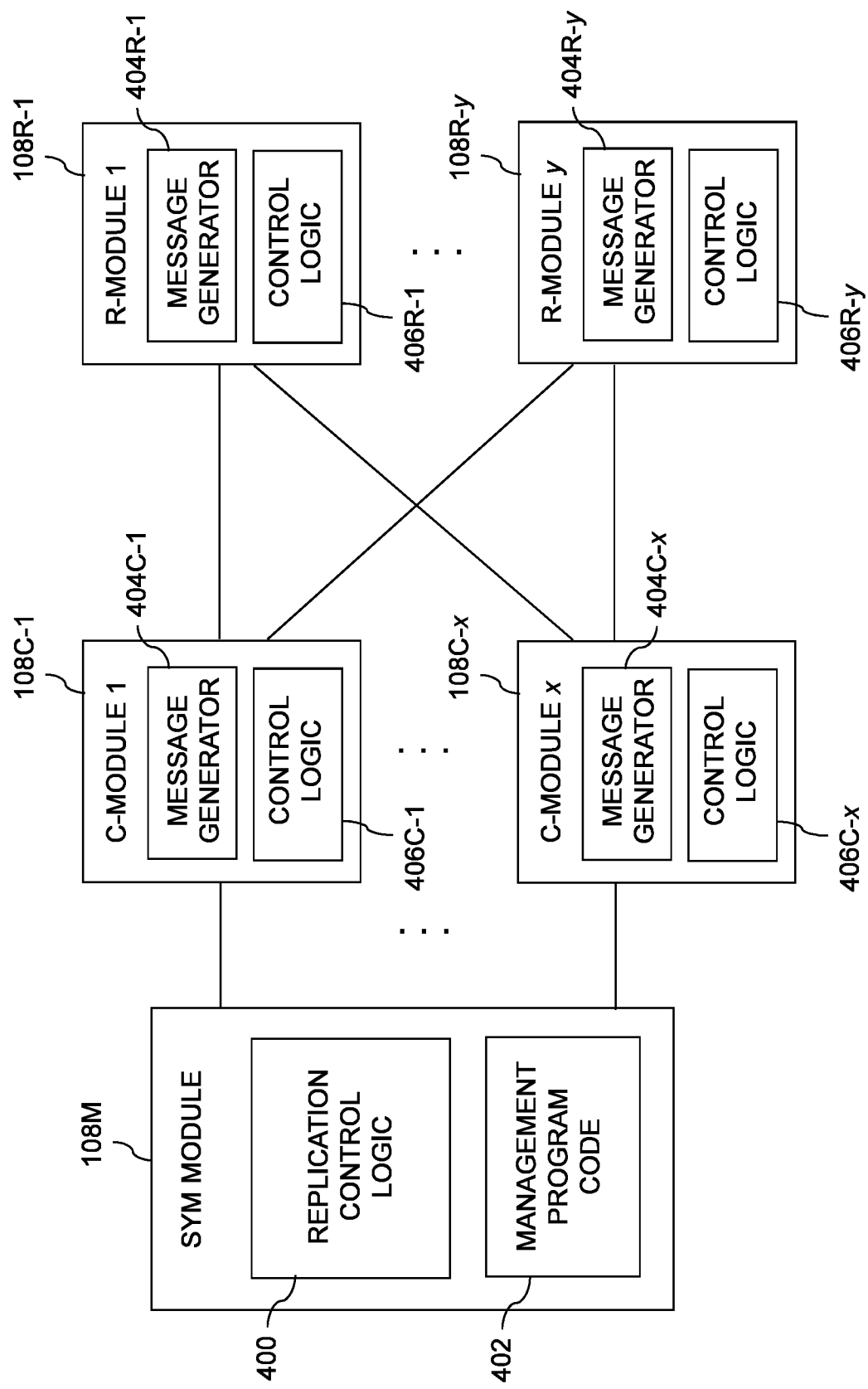
FIG. 4 illustrates a portion of a distributed storage controller of a content addressable storage system showing one possible arrangement supporting a replication process using control modules and routing modules of the distributed storage controller.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises replication control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective message generators 404C-1 through 404C-x. These message generators 404C are utilized by corresponding instances of replication control logic 406C-1 through 406C-x to generate control-to-routing messages to one or more of the routing modules 108R in conjunction with a replication process.

For example, a data transfer request for the given data page in the asynchronous replication mode is illustratively initiated by a given one of the control modules 108C directing a control-to-routing message to a given one of the routing modules 108R. The control-to-routing message is generated by the corresponding one of the message generators 404C, under the control of the corresponding instance of replication control logic 406C, operating in conjunction with replication control logic 400 of the management module 108M. The control-to-routing message comprises a logical page address of the given data page, including an identifier of a corresponding LUN and an offset of the given data page within the LUN. It also includes a current content-based signature for the data page, and may include additional information, such as various external identifying information for the corresponding storage volume.

The routing modules 108R-1 through 108R-y in the FIG. 4 embodiment comprise respective message generators 404R-1 through 404R-y. These message generators 404R are utilized by corresponding instances of replication control logic 406R-1 through 406R-y to generate routing-to-control messages for transmission to one or more of the control modules 108C in conjunction with the replication process.

The given one of the routing modules 108R that receives the above-noted data transfer request is configured to update the content-based signature of the given data page. This illustratively involves reading the given data page and recomputing the content-based signature of the given data page responsive to a determination that current content of the given data page is inconsistent with an existing content-based signature of the given data page. The given routing module 108R reads the given data page under the control of its corresponding instance of replication control logic 406R utilizing a read operation that automatically holds an address lock on the given data page for a duration of the read operation. The content-based signature is illustratively updated for the given data page by applying a secure hashing algorithm to content of the given data page.

The other control logic instances 406C and 406R in the other control and routing modules 108C and 108R are similarly configured to control the transmission of control-to-routing messages and associated routing-to-control messages in order to implement portions of a replication process as disclosed herein.

Portions of the replication process executed at the source site are collectively implemented by the instances of replication control logic 400, 406C and 406R of the respective storage node processing modules 108M, 108C and 108R of the first storage system. Similar instances of replication control logic in the second storage system are configured to perform the target site portions of the replication process.

The particular interconnection and signaling arrangements illustrated for processing modules 108C, 108R and 108M in FIG. 4 are presented by way of example only and can be varied in other embodiments.

In some embodiments, the replication control logic of these processing modules comprises at least a portion of a replication engine of the storage controller 108.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement an asynchronous and synchronous transmit priority mechanism in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with an asynchronous and synchronous transmit priority mechanism can be offered to cloud infrastructure customers or other users as a PaaS offering.

Figure 5:
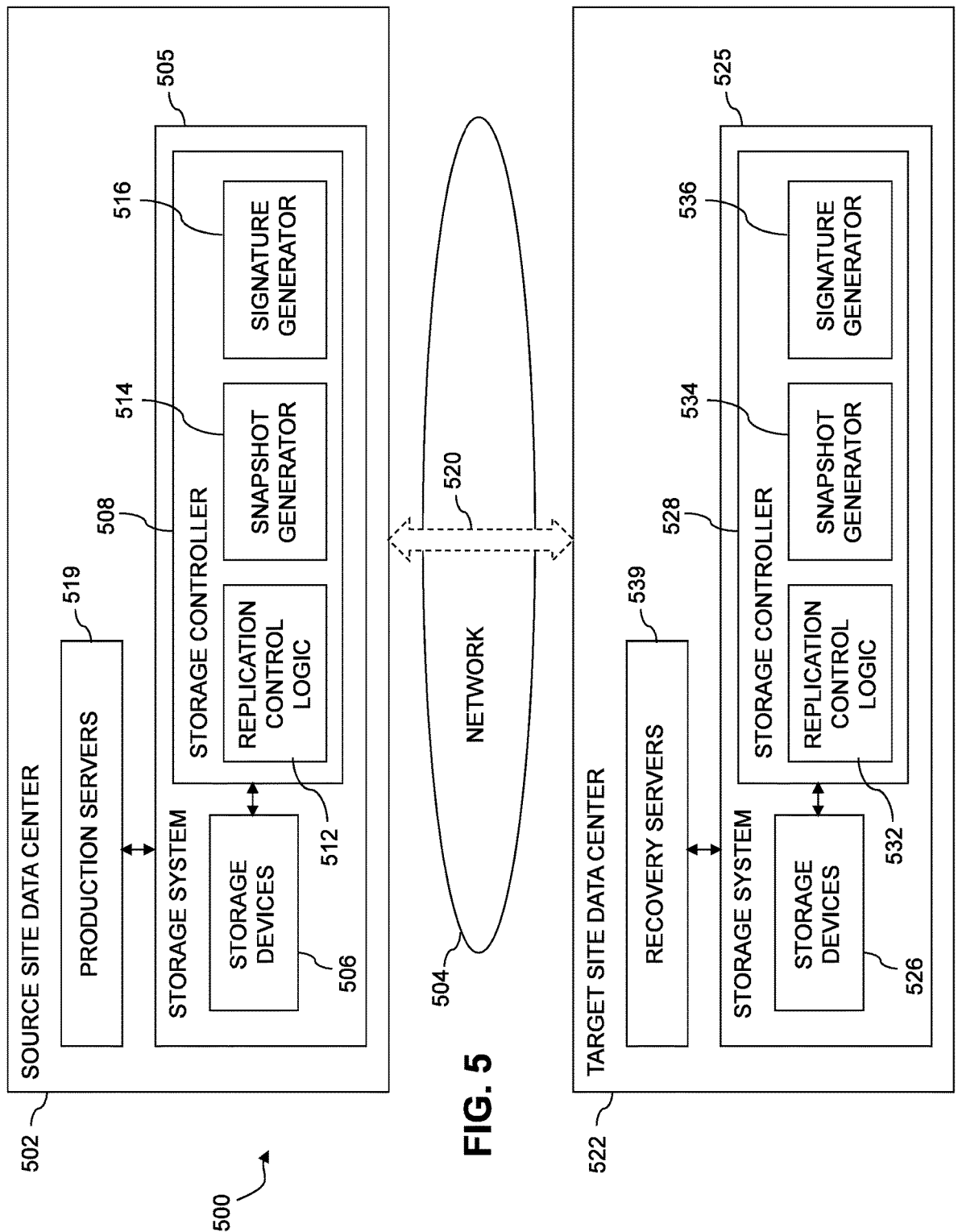
FIG. 5 is a block diagram of an information processing system comprising target site and source site storage systems configured for managing an asynchronous and synchronous transmit priority mechanism in an illustrative embodiment.

Additional details of illustrative embodiments will now be described with reference to FIGS. 5, 6 and 7A-C. FIG. 5 illustrates an example of information processing systems that each include a first content addressable storage system such as content addressable storage system 105 of the FIG. 1 embodiment that is configured to participate in a replication process with another storage system over at least one network.

In the context of the FIG. 5 embodiment, the storage systems participating in the replication process are assumed to be associated with respective source and target sites of the replication process. For example, the source site may comprise a production site data center and the target site may comprise a disaster recovery site data center.

Referring now to FIG. 5, an information processing system 500 in an illustrative embodiment comprises a source site data center 502 coupled to at least one network 504. The source site data center 502 comprises a storage system 505 having storage devices 506 and an associated storage controller 508. The storage controller 508 comprises replication control logic 512, snapshot generator 514 and signature generator 516. The source site data center 502 further comprises a set of production servers 519 coupled to the storage system 505.

As indicated above, the storage system 505 in the present embodiment is assumed to comprise a content addressable storage system, although other types of storage systems can be used in other embodiments.

The source site data center 502 is coupled via one or more communication channels 520 of the network 504 to a target site data center 522 of the system 500. The target site data center 522 comprises a storage system 525. The storage system 525 comprises storage devices 526 and an associated storage controller 528. The storage controller 528 comprises replication control logic 532, snapshot generator 534 and signature generator 536.

The target site data center 522 further comprises a set of recovery servers 539 coupled to the storage system 525. The storage system 525, like the storage system 505, is assumed to comprise a content addressable storage system, although again other types of storage systems can be used in other embodiments.

The source site data center 502 and the target site data center 522 are examples of what are more generally referred to herein as respective ones of a "source site" and a "target site" of an information processing system. The source site data center 502 and the target site data center 522 will therefore also be referred to herein as respective source site 502 and target site 522 of the system 500. In some embodiments, the target site 522 comprises a disaster recovery site data center and the source site 502 comprises a production site data center, although other arrangements are possible.

The source site 502 and target site 522 may be implemented in respective distinct local and remote geographic locations, although it is also possible for the two sites to be within a common facility or even implemented on a common processing platform.

It is assumed that data is replicated in system 500 from the source site 502 to the target site 522 using asynchronous and synchronous replication modes. Typically, a given replication process will begin in an asynchronous replication mode, and will subsequently transfer from the asynchronous replication mode to a synchronous replication mode. For example, the asynchronous replication mode may be used to replicate the bulk of a given set of data from the first storage system to the second storage system. The mirroring functionality of the synchronous replication mode is then enabled. Other arrangements utilizing different replication modes are possible.

The synchronous replication mode in some embodiments is illustratively configured to mirror data writes between the first and second storage systems. For example, when a host device writes data to the first storage system, the first storage system responds to the host device with an acknowledgement of successful storage in the first storage system only after the first storage system sends the data to the second storage system and receives an acknowledgement of successful storage back from the second storage system.

The asynchronous replication mode in some embodiments implements cycle-based asynchronous replication to periodically transfer data in multiple cycles from the source site 502 to the target site 522. The data replicated from the source site 502 to the target site 522 can include all of the data stored in the storage system 505, or only certain designated subsets of the data stored in the storage system 505. Different replication processes of different types can be implemented for different parts of the stored data.

An exemplary cycle-based asynchronous replication process will now be described in more detail. Such a process is assumed to represent one possible implementation of an asynchronous replication mode of a replication process that includes both asynchronous and synchronous replications modes as well as support for concurrent operation of such modes and separate operation of the individual modes. The term "mode" as used herein in conjunction with asynchronous or synchronous replication may therefore itself comprise a corresponding asynchronous or synchronous replication process.

In order to conserve bandwidth on the communication channels 520 between the source site 502 and the target site 522, data is transferred incrementally in the asynchronous replication mode. This means that instead of sending all the data stored at the source site 502 to the target site 522 in each cycle, only the data that has been changed during each cycle is transferred. The changed data is an example of what is more generally referred to herein as "differential data." A given set of differential data transferred from the source site 502 to the target site 522 in a given one of the cycles of the cycle-based asynchronous replication process represents a "delta" between a pair of source site snapshots generated by the snapshot generator 514 of the storage controller 508 for a corresponding pair of the cycles. Each source site snapshot captures the state at a particular point in time of the data to be replicated from the source site 502 to the target site 522. It is assumed that one such source site snapshot is generated by the snapshot generator 514 in conjunction with each of the cycles of the asynchronous replication process.

A given one the cycles of the cycle-based asynchronous replication process illustratively encompasses an amount of time spent sending a corresponding one of the sets of differential data or deltas from the source site 502 to the target site 522. There is a lag time between the data at the source site 502 and the replicated data at the target site 522. More particularly, the replicated data at the target site 522 is "older" than the data at the source site 502 by the lag time, as the production servers 519 continue to write to the storage system 505 after the source site snapshots are taken for respective ones of the cycles. For example, if the cycles of the cycle-based asynchronous replication process each take 30 seconds, then the lag time in some embodiments may vary between 30 seconds and 60 seconds. A recover point objective or RPO in some embodiments can be specified as a maximum amount of lag time that the replicated data can have.

The lag time in some embodiments is more particularly specified as an amount of time between initiation of transfer of a given one of the sets of differential data by the storage system 505 of the source site 502 and update of the corresponding target site snapshot by the storage system 525 of the target site 522. It is to be appreciated, however, that other specifications of the lag time can be used.

As noted above, an advantage of transferring data incrementally from the source site 502 to the target site 522 using a cycle-based asynchronous replication process is that it conserves bandwidth on the communication channels 520.

For example, each byte of data written by the production servers 519 to the storage system 505 need only be transferred once. However, the downside is that if there is problem in any one of the cycles, the replicated data at the target site 522 will be corrupted from that point on. This is a silent corruption that without appropriate verification of the replicated data will not be discovered until recovery servers 539 are started and begin to utilize the replicated data in conjunction with disaster recovery or another similar type of recovery situation. It is therefore very important for the replicated data to be verified in an appropriate manner before such a recovery situation arises.

The production servers 519 at the source site 502 illustratively run applications for users of the system 500. These servers are configured to store application data in the storage system 505. This application data is illustratively part of the data stored in storage system 505 that is replicated from the source site 502 to the target site 522. The recovery servers 539 at the target site 522 are configured to take up the running of the applications for the users of the system 500 in the event of a disaster recovery or other recovery situation. The applications on the recovery servers 539 of the target site 522 are started using the data that has been replicated to the target site 522 in the cycle-based asynchronous replication process.

The production servers 519 and recovery servers 539 of the respective source site 502 and target site 522 illustratively comprise respective processing devices of one or more processing platforms of the corresponding source site 502 or target site 522. For example, these servers can comprise respective VMs each having a processor and a memory, although numerous other configurations are possible. At least portions of the source site 502 and target site 522 can be implemented in cloud infrastructure such as an AWS system or another cloud-based system such as GCP or Microsoft Azure.

As indicated previously, the storage systems 505 and 525 of the source and target sites 502 and 522 are configured in the present embodiment for automatic verification of asynchronously replicated data over multiple cycles of a cycle-based asynchronous replication process. This illustratively involves asynchronously replicating data from the storage devices 506 of the storage system 505 to the storage devices 526 of the storage system 525 and automatically verifying the correctness of portions of the replicated data over multiple cycles.

As will be described in more detail below, the automatic verification of the asynchronously replicated data in the present embodiment may be performed in a manner that advantageously avoids the need to verify all of the transferred data in each cycle. As a result, the cycles can be made significantly more compact than would otherwise be possible. This results in enhanced efficiency in the replication process and thereby facilitates the achievement of recover point objectives in system 500.

As noted above, the storage systems 505 and 525 of the source and target sites 502 and 522 may comprise respective content addressable storage systems having respective sets of non-volatile memory storage devices.

Additionally or alternatively, the storage systems 505 and 525 of the source and target sites 502 and 522 may comprise respective clustered storage systems having respective sets of storage nodes each having a plurality of storage devices.

In some embodiments, the storage systems 505 and 525 illustratively comprise scale-out all-flash storage arrays such as XtremIO™ storage arrays from Dell EMC of Hopkinton, Massachusetts. Other types of storage arrays, including by way of example Unity™, VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices 506 and 526 of respective storage systems 505 and 525 illustratively implement a plurality of LUNs configured to store files, blocks, objects or other arrangements of data.

In the present embodiment, the storage system 525 of the target site 522 is configured to participate in a cycle-based asynchronous replication process with the storage system 505 of the source site 502. This cycle-based asynchronous replication process is illustratively implemented in system 500 by cooperative interaction of the storage systems 505 and 525 over network 504 using their respective replication control logic 512 and 532, snapshot generators 514 and 534, and signature generators 516 and 536. Examples of cycles of an illustrative cycle-based asynchronous replication process of this type will be described in more detail below.

The storage system 525 of the target site 522 is more particularly configured in this embodiment to receive from the storage system 505 of the source site 502, in respective ones of a plurality of cycles of the cycle-based asynchronous replication process, corresponding sets of differential data representing respective deltas between pairs of source site snapshots for respective pairs of the cycles. The source site snapshots are generated by the snapshot generator 514 of the storage controller 508.

The storage system 525 of the target site 522 illustratively utilizes the sets of differential data received in the respective ones of the cycles to update respective target site snapshots for those cycles. The target site snapshots are generated by the snapshot generator 534 of the storage controller 528.

Over multiple ones of the cycles, the storage system 525 of the target site 522 generates target site signatures for respective different portions of a designated one of the updated target site snapshots. The target site signatures are generated by the signature generator 536 of the storage controller 528. The storage system 525 also receives from the storage system 505 of the source site 502 corresponding source site signatures for respective different portions of a designated one of the source site snapshots. The source site signatures are generated by the signature generator 516 of the storage controller 508. The storage system 525 compares the target site and source site signatures over the multiple cycles in order to verify that the designated target and source site snapshots are equivalent.

The verification of equivalence of the designated target site and source site snapshots in this embodiment is therefore spread over the multiple cycles, with pairs of target site and source site signatures for the different portions of those snapshots being compared in respective ones of the multiple cycles.

Terms such as "equivalent" and "equivalence" as used herein in conjunction with verification of replicated data by comparison of target site and source site snapshots are intended to be broadly construed to encompass various arrangements for confirming that the target site snapshot is an accurate and correct version of its corresponding source site snapshot. Such equivalence herein is a type of functional equivalence in that the replicated data when utilized by one or more applications running on the recovery servers 539 will produce the same results that would be produced by the corresponding source site data when utilized by one or more applications running on the production servers 519.

It is also important to note that the transferring of the data in cycles in this embodiment is separate from the verifying of the transferred data. The data transferred each cycle comprises the above-noted delta between two snapshots taken at respective ones of two different points in time. The data verification illustratively involves selecting a particular one of the target site snapshots, and then verifying the data in that snapshot over multiple cycles through the comparison of target site signatures for different portions of the selected target site snapshot to corresponding source site signatures. The transferred data comprising the deltas sent from the source site 502 to the target site 522 are not verified in each cycle.

The target site and source site signatures generated by the respective signature generators 516 and 536 illustratively comprise at least one of a checksum and a hash of corresponding portions of the designated target site and source site snapshots.

The different portions of the designated target site and source site snapshots for which the verification of equivalence is spread over the multiple cycles of the cycle-based asynchronous replication process may comprise respective percentages of the designated target site and source site snapshots. For example, different percentages of the designated target site and source site snapshots may be utilized in different ones of the multiple cycles. Alternatively, a fixed percentage of the designated target site and source site snapshots may be utilized in each of the multiple cycles. As a more particular example of the latter approach, the target site and source site signatures for different n percent portions of the designated target site and source site snapshots are verified in each of 100/n of the cycles.

In these and other embodiments, the different portions of the designated target site and source site snapshots for which the verification of equivalence is spread over the multiple cycles can be determined at least in part based on a number n of the cycles of the cycle-based asynchronous replication process that are expected to be executed within a given time period. For example, the different portions of the designated target site and source site snapshots for which the verification of equivalence is spread over the multiple cycles may be determined by first determining the expected number of cycles n for the given time period and then computing 100/n to determine a percentage of the designated target site and source site snapshots to be verified in each of the n cycles.

Additionally or alternatively, the different portions of the designated target site and source site snapshots for which the verification of equivalence is spread over the multiple cycles can be dynamically adapted over time in order to control a lag time between initiation of transfer of a given one of the sets of differential data by the storage system 505 of the source site 502 and update of the corresponding target site snapshot by the storage system 525 of the target site 522.

For example, such dynamic adaptation can be implemented by, for a current one of the multiple cycles, calculating a verification rate as a function of a time elapsed for verification of a given one of the portions in a previous one of the multiple cycles, calculating an amount of time remaining in a recover point objective period for the current cycle, and multiplying the verification rate by the amount of time remaining in the recover point objective period for the current cycle to determine a particular portion of the designated target site and source site snapshots to be verified in the current cycle.

If the particular portion determined by multiplying the verification rate by the amount of time remaining in the recover point objective period for the current cycle is less than a specified minimum portion, the minimum portion is verified in the current cycle.

Further details regarding automatic verification of asynchronously replicated data suitable for use in illustrative embodiments herein can be found in U.S. patent application Ser. No. 15/662,809, filed Jul. 28, 2017 and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

The particular exemplary cycle-based asynchronous replication processes described above can be varied in other embodiments. Alternative synchronous replication processes may also be used. As mentioned previously, such processes are performed in respective asynchronous and synchronous replication modes of a replication process that incorporates both asynchronous and synchronous replication.

Each of the source site 502 and target site 522 in the FIG. 5 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 508 and 528 or various components thereof can each be implemented in the form of one or more LXCs running on one or more VMs. Other arrangements of one or more processing devices of a processing platform can be used to implement the storage controllers 508 and 528 and/or their respective components. Other portions of the system 500 can similarly be implemented using one or more processing devices of at least one processing platform.

The source site 502 and target site 522 are illustratively implemented on respective distinct processing platforms, although numerous other arrangements are possible. For example, in some embodiments at least portions of the source site 502 and the target site 522 may be implemented on the same processing platform. The term "processing platform" as used herein is intended to be broadly construed so as to encompass, by way of illustration and without limitation, multiple sets of processing devices and associated storage systems that are configured to communicate over one or more networks.

Again, it is to be appreciated that these and other features of illustrative embodiments are presented by way of example only, and should not be construed as limiting in any way. Accordingly, different numbers, types and arrangements of system components such as source and target sites 502 and 522 and their respective storage systems 505 and 525 and storage controllers 508 and 528 can be used in other embodiments. In these other embodiments, only subsets of these components, or additional or alternative sets of components, may be used, and such components may exhibit alternative functionality and configurations.

The replication process carried out between the source site storage system 505 and the target site storage system 525 in the FIG. 5 embodiment utilizes the asynchronous and synchronous transmit priority mechanism in conjunction with the content addressable storage system 105 of FIG. 1. Examples of the asynchronous and synchronous transmit priority mechanism will now be described in further detail with reference to FIGS. 6 and 7A-C.

Figure 6:
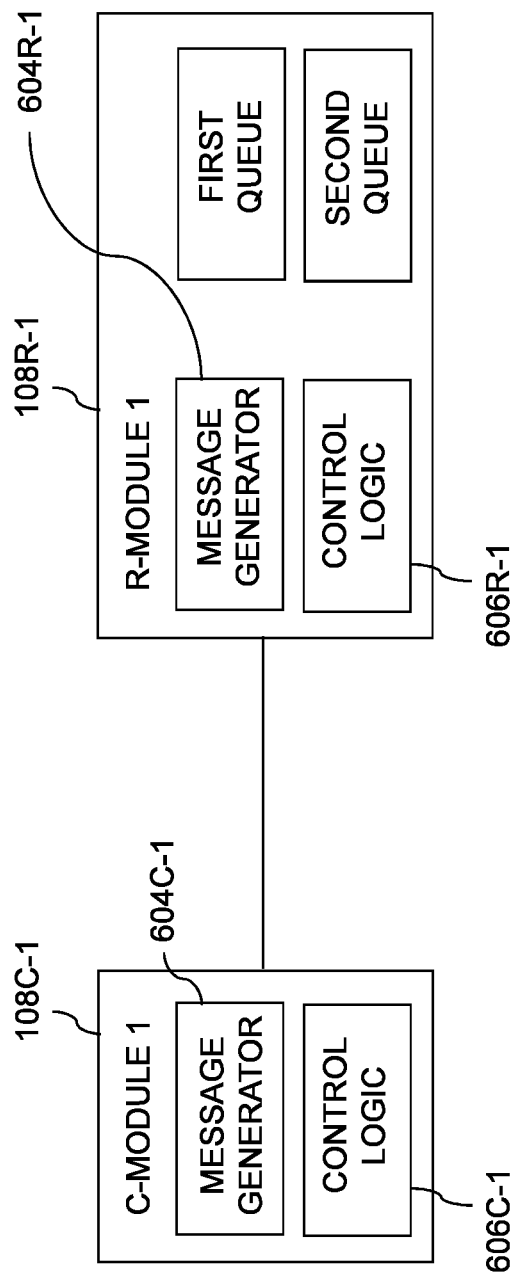
FIG. 6 illustrates a portion of a distributed storage controller of a content addressable storage system showing one possible arrangement supporting a replication process using a routing module comprising a first queue and a second queue of the distributed storage controller.

Referring now to FIG. 6, an expanded view of a portion of the distributed storage controller 108 in an illustrative embodiment is shown. This embodiment illustrates an example embodiment where the routing module comprises a first queue and a second queue.

As explained above, a data transfer request for the given data page in the asynchronous replication mode is illustratively initiated by a given one of the control modules 108C-1 directing a control-to-routing message to a given one of the routing modules 108R-1. The control-to-routing message is generated by the corresponding one of the message generators 604C-1, under the control of the corresponding instance of replication control logic 606C-1, operating in conjunction with replication control logic 400 of the management module 108M. The control-to-routing message comprises a logical page address of the given data page, including an identifier of a corresponding LUN and an offset of the given data page within the LUN. It also includes a current content-based signature for the data page, and may include additional information, such as various external identifying information for the corresponding storage volume.

The routing module 108R-1 comprises a respective message generator 604R-1. The message generator 604R-1 is utilized by corresponding instances of replication control logic 606R-1 to generate routing-to-control messages for transmission to one or more of the control modules 108C-1 in conjunction with the replication process.

The control logic instances 406C-1 and 406R-1 in the other control and routing modules 108C-1 and 108R-1 are similarly configured to control the transmission of control-to-routing messages and associated routing-to-control messages in order to implement portions of a replication process as disclosed herein. In some embodiments, the replication control logic of these processing modules comprises at least a portion of a replication engine of the storage controller 108.

The operation of the asynchronous and synchronous transmit priority mechanism will now be described in further detail with reference to the flow diagrams of the illustrative embodiment of FIGS. 7A-C. The process as shown includes steps 700 and 701 and is applicable to other types of information processing systems, including systems 100 and 500 of respective FIGS. 1 and 5, in which multiple storage systems are configured to participate in a replication process. The steps are illustratively performed by cooperative interaction of replication engines or other arrangements of replication control logic of respective storage controllers in respective source site and target site storage systems. A given such storage controller in a source site or target site storage system can comprise a distributed storage controller implemented in the manner illustrated in FIG. 1 or 5.

In an example embodiment, at 700, the method receives a plurality of replication requests in conjunction with a replication process, where the plurality of replication requests comprises at least one of a first replication request or a second replication request, and where a first storage system comprising a plurality of storage devices is configured to participate in the replication process with a second storage system comprising a plurality of storage devices. In an example embodiment, the first replication request comprises a synchronous replication request and the second replication request comprises an asynchronous replication request. In an example embodiment at 705, the plurality of replication requests is received at a first module, for example, the routing module 108R from a second module, for example the control module 108C. In another example embodiment, at least one of the asynchronous replication requests has been optimized at the control module 108C prior to transmission to the routing module 108R.

After receiving the plurality of replication requests, at 701, the method determines an execution order to optimize the processing of the plurality of replication requests, where a first replication request execution order that optimizes processing of at least one first replication request conflicts with optimizing processing of at least one second replication request. In an example embodiment, determining the execution order is performed within the routing module 108R. In an example embodiment, optimizing the processing of the asynchronous replication requests requires providing bandwidth to accommodate the size of the asynchronous replication requests, and to process the asynchronous replication requests efficiently. This asynchronous replication request optimization adds a latency to the synchronous replication request, thereby reducing the optimization of the synchronous replication requests (i.e., the synchronous replication requests wait for the asynchronous replication requests to complete before the synchronous replication requests are processed). Likewise, optimizing the synchronous replication requests by reducing the latency associated with processing the synchronous replication requests may starve the asynchronous replication requests for the bandwidth needed to process the asynchronous replication requests efficiently, and therefore, reduces the optimization of the asynchronous replication requests. For example, to reduce any latency associated with processing the synchronous replication requests, the routing module 108R that receives the synchronous replication requests may process each of the synchronous replication requests as they come in. While the routing module 108R is processing the synchronous replication requests, the asynchronous replication requests are not provided the bandwidth needed to process the asynchronous replication requests efficiently. For example, the asynchronous replication requests are processed more efficiently if the routing module 108R packages up the asynchronous replication requests into large transmissions, for example, efficiently sending a 1 MB transmission once instead of sending 1 kb transmissions 1,000 times. Thus, while the routing module 108R is processing the synchronous replication requests, the asynchronous replication requests are starved for bandwidth. Likewise, if the routing module 108R provides the asynchronous replication requests the bandwidth necessary to process the asynchronous replication requests efficiently, the synchronous replication requests are waiting to be processed, and their latency may increase to unacceptable levels.

Embodiments disclosed herein provide a first queue for the synchronous replication requests and a second queue for the asynchronous replication requests. In an example embodiment, at 710, the routing module 108R receives at least one replication request. The routing module 108R inspects the replication request. In an example embodiment, after receiving the plurality of replication requests, the method assigns at least at least one first replication request to a first queue and assigns at least one second replication request to a second queue. For example, the first queue may be a high priority queue, and the second queue may be a low priority queue. In this example embodiment, at 715, the method assigns at least one synchronous replication request to the high priority queue (i.e., the first queue) and, at 720, assigns at least one asynchronous replication request to the low priority queue (i.e., the second queue).

In an example embodiment, the method polls the first queue and the second queue according to a polling frequency value. The polling frequency value may be, for example, initially selected by a user. In another example embodiment, the polling frequency value is selected by a machine learning system. In an example embodiment, at 725, the method determines the polling frequency value. In an example embodiment, at 730, the method polls the first queue and the second queue according to the polling frequency value and processes the replication requests in the first queue and the second queue. Thus, the synchronous replication requests are processed promptly to reduce any latency issues, while the asynchronous replication requests are also processed with the bandwidth needed to process the asynchronous replication requests efficiently.

In an example embodiment, the method polls the first queue, repeatedly, for at least one first replication request. In an example embodiment, the method polls the first queue a number of times less than the polling frequency value. For example, if the polling frequency value is five, the method may poll the first queue four times for four of the first replication requests (i.e., synchronous replication requests) in the first queue. In an example embodiment, the first queue may contain more than four synchronous replication requests, and method polls the first queue for the first four synchronous replication requests in the queue, and processes those four synchronous replication requests. After repeatedly polling the first queue four times, the method polls the second queue for at least one second replication request (i.e., asynchronous replication requests). After polling the second queue for at least one second replication request, the method, again, repeatedly polls the first queue the number of times fewer than the polling frequency value. For example, if the method polled the first queue four times, after polling the second queue at least one time, the method may then poll the first queue again, four or fewer times. In another example embodiment, the number of times fewer than the polling frequency value is one less than the polling frequency value. Thus, if the polling frequency value is seven, the method may poll the first queue six times, then poll the second queue once, and then poll the first queue, again, six times, to process the plurality of replication requests. In the above example scenarios, each of the synchronous replication requests and asynchronous replication requests get their chance to be processed. In an example embodiment, the method may poll the first queue any number of times less than the polling frequency value. Thus, if the polling frequency value is six, the method may poll the first queue any number of times less than six. In an example embodiment, at 735, if either queue has at least one replication request, the method executes the oldest replication request in that queue first.

In an example embodiment, the polling frequency value may be adjusted to give greater priority to either the first queue or the second queue. In an example embodiment, at 740, the method updates the polling frequency value based on, for example, system performance, queue sizes, etc. In an example embodiment, after updating the polling frequency value, the method returns to 730, where the routing module 108R uses the polling frequency value to select either the first queue or the second queue, and processes replication requests in the selected queue.

In an example embodiment, the method may also poll a third queue that contains management commands/requests. For example, a management request may be creating a snapshot on the remote side, checking available resources, controlling a state (activate, terminate, suspend, etc.), etc. In an example embodiment, if the third queue is not empty, the method may give first priority to executing the management commands residing in the third queue, and then return to processing the replication requests in the first queue and second queue according to the polling frequency value.

In example embodiment, when the method polls the first queue, the method determines the first queue is empty. In this example embodiment, the method then polls the second queue for at least one of the second replication requests. Thus, as noted above, the method polls the first queue a number of times less than the polling frequency value, and the polls the second queue once before returning to poll the first queue. However, if the first queue is empty during the first polling, or any of the subsequent polling of the first queue, the method then polls the second queue. Thus, if the first queue is empty, no resources are wasted, and the second queue is processed to execute, for example, one or more of the asynchronous replication requests in the second queue.

In an example embodiment, the method tunes the polling frequency value to optimize the processing of the plurality of replication requests. In an example embodiment, the method may determine a latency associated with processing at least one first replication request and tune the polling frequency value according to a range that meets a latency requirement. For example, the method may determine an acceptable latency associated with processing the synchronous replication requests. Once the acceptable latency is determined, the method tunes the polling frequency value to at least approach the acceptable latency. In other words, the method may increase or decrease the polling frequency value to meet the latency value that is acceptable for processing the synchronous replication requests. For example, if the polling frequency value is ten, the method polls the first queue (containing the synchronous replication requests) nine times, and then polls the second queue (containing the asynchronous replication requests) once. Therefore, in an example embodiment, 90% of the synchronous replication requests are processed. Thus, by tuning the polling frequency value, a percentage of the CPU is guaranteed to be spent on processing synchronous replication requests, and the I/O rate may be calculated, knowing the worse impact. By varying the polling frequency value, the performance of processing the replication requests may be adjusted to take more bandwidth from the asynchronous replication requests to process the synchronous replication requests, or to increase the latency of the synchronous replication requests to provide more bandwidth to the asynchronous replication requests.

In an example embodiment, the method may determine a bandwidth requirement associated with processing at least one second replication request and tune the polling frequency value according to a range that meets a bandwidth range. For example, the method may determine an acceptable bandwidth range associated with processing the asynchronous replication requests. Once the acceptable bandwidth range is determined, the method tunes the polling frequency value to at least approach the acceptable bandwidth range. In other words, the method may decrease or increase the polling frequency value to meet the bandwidth range that is acceptable for processing the asynchronous replication requests.

In an example embodiment, the method tunes the polling frequency value to balance a latency requirement associated with the first replication request with providing a bandwidth range associated with the second replication request. In other words, the method tunes the polling frequency value to balance the latency required by the synchronous replication requests with the bandwidth required by the asynchronous requests. In an example embodiment, the tuning is performed by a machine learning system. For example, a user may require a latency for the synchronous replication requests to be no more than 10 ms. The machine learning system may begin processing the plurality of replication requests with a polling frequency value of two, and then measure the latency that the host sees for synchronous host writes. If the latency is above the user's maximum value, the machine learning system may increase the frequency polling value, wait (for example) for one minute, and then measure the new latency. If, again, the new latency is above the user's maximum value, the machine learning system continues to adjust the polling frequency value. In an example embodiment, if the latency does meet the user's acceptable range, the machine learning system can decrease the polling frequency value, wait one minute, and then measure the new latency. If the new latency is still within the user's acceptable range, the machine learning system can continue to decrease the polling frequency value so as to stay within an acceptable range for the user's requirements while at the same time, providing additional bandwidth for the asynchronous replication requests. In an example embodiment, the machine learning system continues to tune the polling frequency value so that the polling frequency value is as small as possible to meet the user's requirements. In another example embodiment, the machine learning system continues to tune the polling frequency value so that the polling frequency value is not a higher value when a lower value can meet the necessary requirements.

Figure 7C:
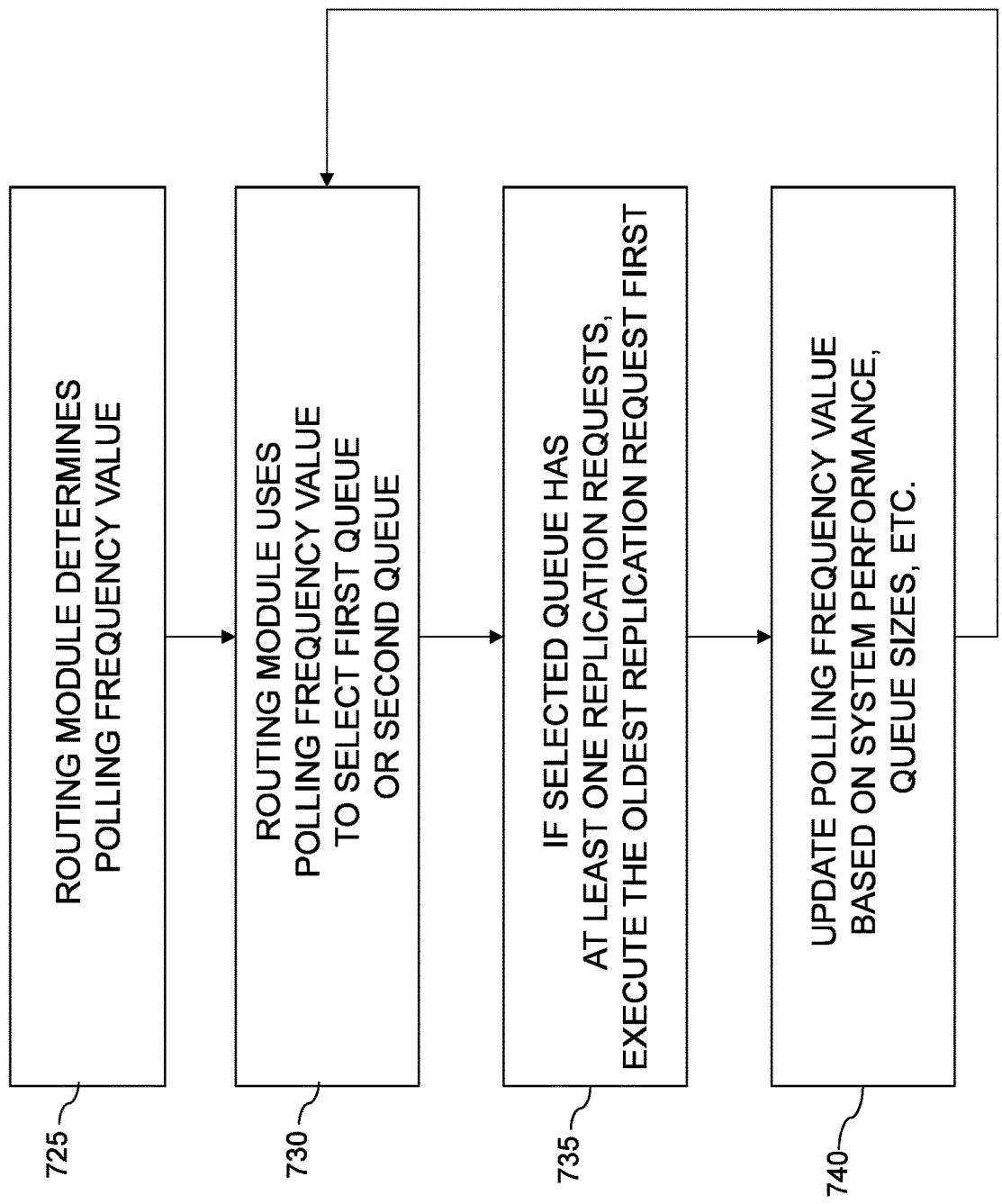

It is also to be appreciated that the FIGS. 7A-C process and other features and functionality for an asynchronous and synchronous transmit priority mechanism as described above can be adapted for use with other types of information systems, including by way of example an information processing system in which source site and target site storage systems are both implemented on the same processing platform.

The particular processing operations and other system functionality described in conjunction with the flow diagrams of FIGS. 7A-C are presented by way of illustrative example only, and should not be construed as limiting the scope of the disclosure in any way. Alternative embodiments can use other types of processing operations for implementing an asynchronous and synchronous transmit priority mechanism. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of asynchronous and synchronous transmit priority mechanisms for respective different sets of replicated data or for different storage systems or portions thereof within a given information processing system.

Functionality such as that described in conjunction with the flow diagrams of FIGS. 7A-C can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108, 508, or 528 that is configured to control performance of one or more steps of the FIGS. 7A-C process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, 508, or 528, as well as other system components, may be implemented at least in part using processing devices of such processing platforms. For example, in a distributed implementation of the storage controller 108, 508, or 528, respective distributed modules of such a storage controller can be implemented in respective LXCs running on respective ones of the processing devices of a processing platform.

In some embodiments, the first and second storage systems comprise respective XtremIO™ storage arrays suitably modified to incorporate asynchronous and synchronous transmit priority mechanism techniques as disclosed herein. As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement an asynchronous and synchronous transmit priority mechanism using the FIGS. 7A-C process.

The asynchronous and synchronous transmit priority mechanism techniques implemented in the embodiments described above can be varied in other embodiments. For example, different types of process operations can be used in other embodiments. Furthermore, although described in some embodiments in the context of data replication from a source to a target, the asynchronous and synchronous transmit priority mechanism techniques in other embodiments can be implemented in the context of other types of data transfer within a given storage system or from one storage system to another storage system.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with functionality for an asynchronous and synchronous transmit priority mechanism as disclosed herein can provide a number of significant advantages relative to conventional arrangements.

For example, some embodiments can advantageously provide significantly improved efficiency in data replication processes carried out between a source site and a target site of a given information processing system.

One or more such embodiments are configured to balance the competing requirements of latency for synchronous replication requests with bandwidth for asynchronous replication requests.

Additionally, some embodiments can advantageously respond to changes in user requirements for latency and/or bandwidth, etc., through a machine learning system that repeatedly evaluates the latency associated with the synchronous replication requests and the bandwidth associated with the asynchronous replication requests.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing systems 100 and 500 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105, 505, and 525, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100 or 500. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments, such as system 500.

Figure 8:
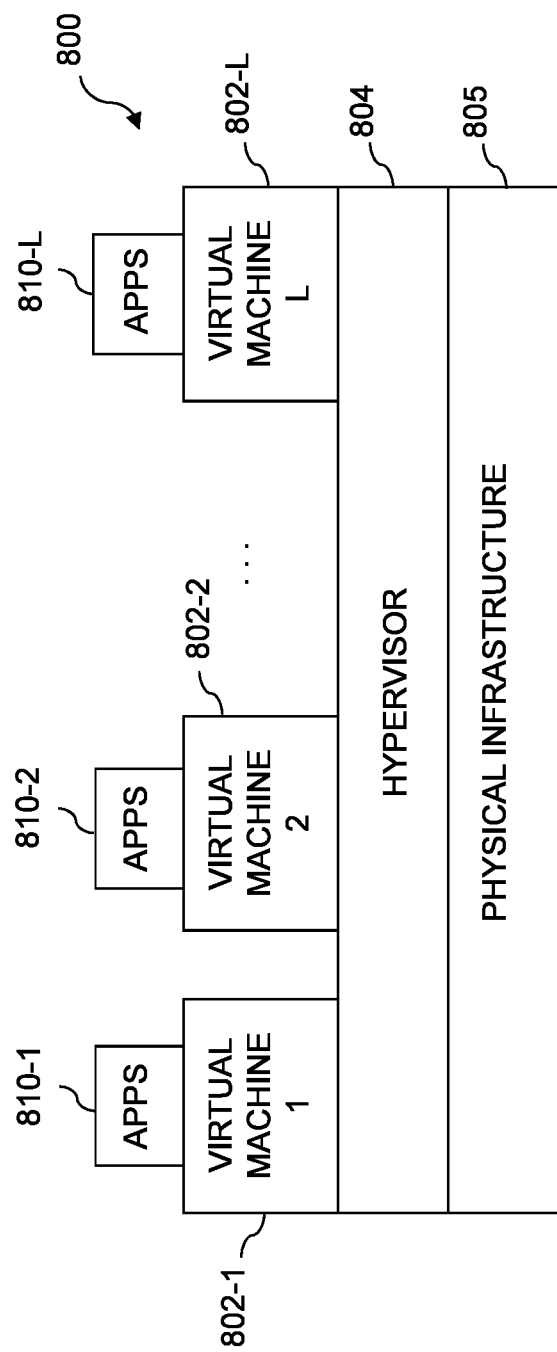
FIGS. 8 and 9 show examples of processing platforms that may be utilized to implement at least a portion of an information processing system in illustrative embodiments.
Figure 9:
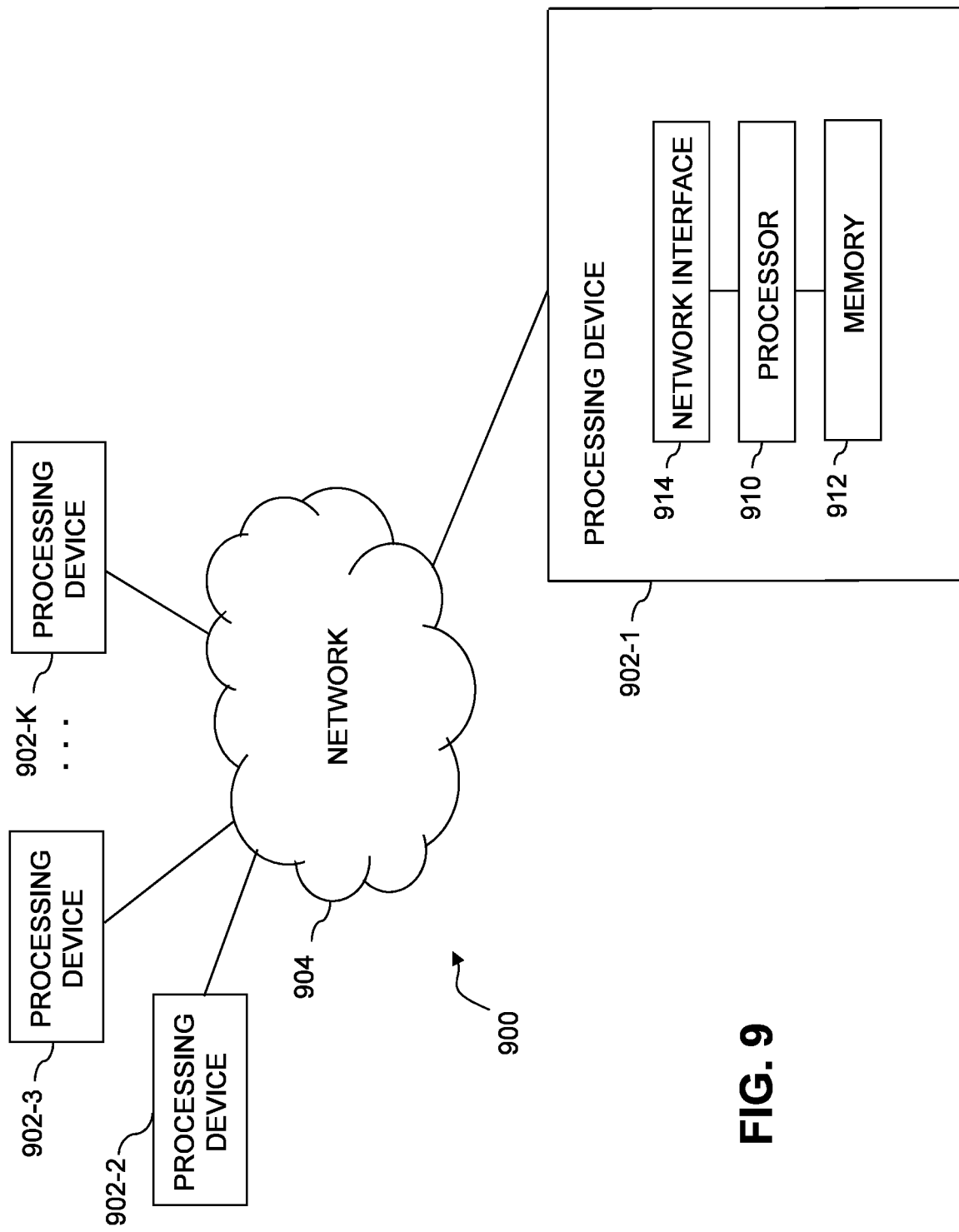

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108, 508, and 528 of systems 100 and 500 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, source and target sites, storage systems, storage nodes, storage devices, storage controllers, replication processes, replication engines and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for managing an asynchronous and synchronous transmit priority mechanism, comprising a first storage system configured to participate in a replication process with a second storage system, the method comprising:
   receiving, by a routing module associated with a content addressable storage system, a plurality of replication requests in conjunction with the replication process, wherein the plurality of replication requests comprises at least one of a first replication request or a second replication request, wherein the first storage system comprises a plurality of storage devices and the second storage system comprises a plurality of storage devices, wherein the routing module receives the plurality of replication requests from a control module associated with the content addressable storage system;
   inspecting, by the routing module, the plurality of replication requests;
   assigning, by the routing module based on the inspection, the at least one first replication request to a first queue, wherein the at least one first replication request is a synchronous replication request, wherein the first queue is a high priority queue;
   assigning, by the routing module based on the inspection, the at least one second replication request to a second queue, wherein the at least one second replication request is an asynchronous replication request, wherein the second queue is a low priority queue;
   determining an execution order to optimize processing of the plurality of replication requests, wherein a first replication request execution order that optimizes processing of the at least one first replication request conflicts with optimizing processing of the at least one second replication request;
   polling a third queue, wherein the third queue stores received management commands;
   if the third queue is not empty, giving the third queue priority over the first queue and the second queue, and executing the management commands, followed by polling the first queue and the second queue according to a polling frequency value, wherein the polling frequency value is a number of times the first queue is polled before polling the second queue, wherein the routing module uses the polling frequency value to select either the first queue or the second queue and processes replication requests in the selected queue, and wherein the routing module uses the polling frequency to minimize resource waste by determining that the selected queue is empty and switching to an unselected queue to process the replication requests;
   if the third queue is empty, polling the first queue and the second queue according to the polling frequency value;
   processing each of the plurality of replication requests in the first queue and the second queue as each queue is polled; and
   updating the polling frequency value based on system performance of the content addressable storage system.

2. The method of claim 1, wherein receiving the plurality of replication requests comprises:
   receiving the plurality of replication requests at a first module, from a second module, wherein the at least one second replication request is optimized at the second module.

3. The method of claim 1, wherein polling the first queue and the second queue according to the polling frequency value comprises:
   polling the first queue for the at least one first replication request, wherein the first queue is repeatedly polled a number of times fewer than the polling frequency value; and
   after repeatedly polling the first queue the number of times, polling the second queue for the at least one second replication request.

4. The method of claim 3, wherein the number of times fewer than the polling frequency value is one less than the polling frequency value.

5. The method of claim 3, wherein polling the second queue for the at least one second replication request comprises:
   after polling the second queue once, repeatedly polling the first queue the number of times fewer than the polling frequency value.

6. The method of claim 1, wherein polling the first queue and the second queue according to the polling frequency value comprises:
   polling the first queue for the at least one first replication request;
   determining the first queue is empty; and
   in response, polling the second queue for the at least one second replication request.

7. The method of claim 1, further comprising:
   tuning the polling frequency value to optimize the processing of the plurality of replication requests.

8. The method of claim 7, wherein tuning the polling frequency value comprises:
   determining a latency associated with processing the at least one first replication request; and
   tuning the polling frequency value according to a range that meets the latency requirement.

9. The method of claim 7, wherein tuning the polling frequency value comprises:
   determining a bandwidth requirement associated with processing the at least one second replication request; and tuning the polling frequency value according to a bandwidth range that meets the bandwidth requirement.

10. The method of claim 7, wherein tuning the polling frequency value comprises:
tuning the polling frequency value to balance the latency requirement associated with the first replication request with providing a bandwidth range associated with the second replication request.

11. The method of claim 7, wherein tuning the polling frequency value comprises:
using a machine learning system to tune the polling frequency value.

12. The method of claim 8, wherein tuning the polling frequency value according to the range that meets the latency requirement comprises:
adjusting the polling frequency value to provide additional bandwidth range associated with the second replication request while continuing to meet the latency requirement.

13. A system for use in managing an asynchronous and synchronous transmit priority mechanism comprising a first storage system configured to participate in a replication process with a second storage system, the system comprising a processor configured to:
receive, by a routing module associated with a content addressable storage system, a plurality of replication requests in conjunction with the replication process, wherein the plurality of replication requests comprises at least one of a first replication request or a second replication request, wherein the first storage system comprises a plurality of storage devices and the second storage system comprises a plurality of storage devices, wherein the routing module receives the plurality of replication requests from a control module associated with the content addressable storage system;
inspect, by the routing module, the plurality of replication requests;
assign, by the routing module based on the inspection, the at least one first replication request to a first queue, wherein the at least one first replication request is a synchronous replication request, wherein the first queue is a high priority queue;
assign, by the routing module based on the inspection, the at least one second replication request to a second queue, wherein the at least one second replication request is an asynchronous replication request, wherein the second queue is a low priority queue;
determine an execution order to optimize processing of the plurality of replication requests, wherein a first replication request execution order that optimizes processing of the at least one first replication request conflicts with optimizing processing of the at least one second replication request;
poll a third queue, wherein the third queue stores received management commands;
if the third queue is not empty, give the third queue priority over the first queue and the second queue, and execute the management commands, followed by polling the first queue and the second queue according to a polling frequency value, wherein the polling frequency value is a number of times the first queue is polled before polling the second queue, wherein the routing module uses the polling frequency value to select either the first queue or the second queue and processes replication requests in the selected queue, and wherein the routing module uses the polling frequency to minimize resource waste by determining that the selected queue is empty and switching to an unselected queue to process the replication requests;
if the third queue is empty, poll the first queue and the second queue according to the polling frequency value;
processing each of the plurality of replication requests in the first queue and the second queue as each queue is polled; and
update the polling frequency value based on system performance of the content addressable storage system.

14. The system of claim 13, wherein the system configured to poll the first queue and the second queue according to the polling frequency value is further configured to:
poll the first queue for the at least one first replication request, wherein the first queue is repeatedly polled a number of times fewer than the polling frequency value; and
after repeatedly polling the first queue the number of times, poll the second queue for the at least one second replication request.

15. The system of claim 14, wherein the number of times fewer than the polling frequency value is one less than the polling frequency value.

16. The system of claim 13, further comprising:
tuning the polling frequency value to optimize the processing of the plurality of replication requests by:
determining a latency associated with processing the at least one first replication request;
tuning the polling frequency value according to a range that meets the latency requirement; and
adjusting the polling frequency value to provide additional bandwidth range associated with the second replication request while continuing to meet the latency requirement.

17. A non-transitory computer program product for managing an asynchronous and synchronous transmit priority mechanism, the computer program product comprising:
a computer readable storage medium having computer executable program code embodied therewith, the program code executable by a computer processor to:
receive, by a routing module associated with a content addressable storage system, a plurality of replication requests in conjunction with the replication process, wherein the plurality of replication requests comprises at least one of a first replication request or a second replication request, wherein the first storage system comprises a plurality of storage devices and the second storage system comprises a plurality of storage devices, wherein the routing module receives the plurality of replication requests from a control module associated with the content addressable storage system;
inspect, by the routing module, the plurality of replication requests;
assign, by the routing module based on the inspection, the at least one first replication request to a first queue, wherein the at least one first replication request is a synchronous replication request, wherein the first queue is a high priority queue;
assign, by the routing module based on the inspection, the at least one second replication request to a second queue, wherein the at least one second replication request is an asynchronous replication request, wherein the second queue is a low priority queue;
determine an execution order to optimize processing of the plurality of replication requests, wherein a first replication request execution order that optimizes processing of the at least one first replication request conflicts with optimizing processing of the at least one second replication request;

poll a third queue, wherein the third queue stores received management commands;

if the third queue is not empty, give the third queue priority over the first queue and the second queue, and execute the management commands, followed by polling the first queue and the second queue according to a polling frequency value, wherein the polling frequency value is a number of times the first queue is polled before polling the second queue, wherein the routing module uses the polling frequency value to select either the first queue or the second queue and processes replication requests in the selected queue, and wherein the routing module uses the polling frequency to minimize resource waste by determining that the selected queue is empty and switching to an unselected queue to process the replication requests;

if the third queue is empty, poll the first queue and the second queue according to the polling frequency value;

processing each of the plurality of replication requests in the first queue and the second queue as each queue is polled; and update the polling frequency value based on system performance of the content addressable storage system.

* * * * *